United States Patent
Thompson

(10) Patent No.: US 9,869,883 B2
(45) Date of Patent: Jan. 16, 2018

(54) TEAR SHAPING FOR REFRACTIVE CORRECTION

(71) Applicant: Vance M. Thompson, Sioux Falls, SD (US)

(72) Inventor: Vance M. Thompson, Sioux Falls, SD (US)

(*) Notice: Subject to any disclaimer, the term of this patent is extended or adjusted under 35 U.S.C. 154(b) by 19 days.

(21) Appl. No.: 14/644,809

(22) Filed: Mar. 11, 2015

(65) Prior Publication Data
US 2016/0266405 A1  Sep. 15, 2016

(51) Int. Cl.
*G02C 7/00* (2006.01)
*G02C 7/04* (2006.01)

(52) U.S. Cl.
CPC ................... *G02C 7/047* (2013.01)

(58) Field of Classification Search
CPC .... G02C 2202/06; G02C 7/046; G02C 7/047; G02C 7/048; G02C 7/049
USPC ....... 351/159.04, 159.34; 604/294, 295, 301, 604/302
See application file for complete search history.

(56) References Cited

U.S. PATENT DOCUMENTS

| | | | |
|---|---|---|---|
| 2,641,161 A | 6/1953 | Silvertstein | |
| 3,246,941 A * | 4/1966 | Moss | G02C 7/04 351/159.02 |
| 3,594,074 A | 7/1971 | Rosen | |
| 3,995,635 A | 12/1976 | Higuchi et al. | |
| 4,194,815 A | 3/1980 | Trombley | |
| 4,353,849 A | 10/1982 | Lewison | |
| 4,886,350 A * | 12/1989 | Wichterle | G02C 7/049 351/159.02 |
| 5,929,968 A | 7/1999 | Cotie et al. | |
| 7,249,849 B2 | 7/2007 | Marmo et al. | |
| 7,559,649 B2 | 7/2009 | Cotie et al. | |
| 7,695,135 B1 | 4/2010 | Rosenthal | |

(Continued)

FOREIGN PATENT DOCUMENTS

| | | |
|---|---|---|
| CA | 2 539 395 A1 | 4/2005 |
| EP | 1 629 317 A2 | 3/2006 |

(Continued)

OTHER PUBLICATIONS

Adaptive Liquid Lens by Changing Aperture, Lichun Ren, Sunwoo Park, Hongwen Ren, and Il-Sou Yoo, Journal of Microelectromechanical Systems, vol. 21, No. 4, pp. 953-958, Aug. 2012.*

(Continued)

*Primary Examiner* — James Greece
*Assistant Examiner* — Travis Fissel
(74) *Attorney, Agent, or Firm* — Patterson Thuente Pedersen, P.A.

(57) ABSTRACT

A lens for refractive tear shaping, having a curved lens body with a peripheral edge and a central opening therein. The central opening is shaped and sized and has a tear shaping edge structured to form a tear meniscus within the central opening. The tear meniscus being formed by interaction of a tear film of the eye and the tear shaping edge and having a posterior curvature conforming to an anterior corneal curvature and an anterior curvature. The anterior curvature is dependent on the size and shape of the central opening and structure of the tear shaping edge.

20 Claims, 9 Drawing Sheets

(56) References Cited

U.S. PATENT DOCUMENTS

| | | | |
|---|---|---|---|
| 7,699,464 B2* | 4/2010 | Iuliano | G02C 7/041 351/159.34 |
| 7,864,440 B2* | 1/2011 | Berge | G02B 3/14 351/159.41 |
| 8,118,426 B2 | 2/2012 | Cotie et al. | |
| 8,149,512 B2* | 4/2012 | Kim | B29D 11/0074 359/230 |
| 8,216,306 B2* | 7/2012 | Coroneo | A61F 2/1613 623/6.13 |
| 8,459,793 B2 | 6/2013 | de Juan, Jr. et al. | |
| 8,506,944 B2 | 8/2013 | Sullivan et al. | |
| 8,599,490 B2* | 12/2013 | Lee | G02B 3/14 359/665 |
| 8,742,623 B1 | 6/2014 | Biederman et al. | |
| 8,764,185 B1 | 7/2014 | Biederman et al. | |
| 8,864,306 B2 | 10/2014 | de Juan, Jr. et al. | |
| 8,867,141 B2* | 10/2014 | Pugh | G02C 7/085 359/665 |
| 8,895,763 B2 | 11/2014 | Reif | |
| 9,046,699 B2* | 6/2015 | Caldarise | A61F 9/0017 |
| 9,198,752 B2* | 12/2015 | Woods | A61F 2/1613 |
| 2004/0096477 A1 | 5/2004 | Chauhan et al. | |
| 2005/0046794 A1* | 3/2005 | Silvestrini | A61B 3/152 351/200 |
| 2007/0225691 A1 | 9/2007 | Silvestrini et al. | |
| 2007/0298220 A1* | 12/2007 | Noda | A61F 13/51476 428/152 |
| 2010/0092452 A1 | 4/2010 | Sullivan et al. | |
| 2010/0232031 A1* | 9/2010 | Batchko | G02B 3/14 359/666 |
| 2010/0233241 A1 | 9/2010 | Leahy et al. | |
| 2011/0059902 A1 | 3/2011 | Sullivan et al. | |
| 2011/0070222 A1 | 3/2011 | Sullivan et al. | |
| 2011/0142908 A1 | 6/2011 | Sullivan et al. | |
| 2011/0184358 A1* | 7/2011 | Weiner | A61F 9/0017 604/290 |
| 2011/0282328 A1 | 11/2011 | Ambati et al. | |
| 2012/0245444 A1 | 9/2012 | Otis et al. | |
| 2012/0321611 A1 | 12/2012 | Sullivan et al. | |
| 2013/0077044 A1 | 3/2013 | de Juan, Jr. et al. | |
| 2013/0261569 A1 | 10/2013 | Weiner et al. | |
| 2013/0265507 A1 | 10/2013 | Ford et al. | |
| 2015/0157315 A1* | 6/2015 | Theobald | A61B 17/0487 606/232 |
| 2015/0366708 A1* | 12/2015 | Lerner | A61M 5/427 604/116 |
| 2016/0067035 A1* | 3/2016 | Gontijo | A61F 2/1601 623/6.17 |

FOREIGN PATENT DOCUMENTS

| | | |
|---|---|---|
| EP | 2 276 496 | 1/2011 |
| EP | 2 276 497 | 1/2011 |
| EP | 2 632 532 | 9/2013 |
| KR | 20-2014-003482 | 6/2014 |
| WO | WO 95/08135 | 3/1995 |
| WO | WO 01/33284 A1 | 5/2001 |
| WO | WO 2004/109368 A2 | 12/2004 |
| WO | WO 2005/034730 A2 | 4/2005 |
| WO | WO 2005/121874 A1 | 12/2005 |
| WO | WO 2007/008666 A2 | 1/2007 |
| WO | WO 2009/137602 A1 | 11/2009 |
| WO | WO 2009/137603 A1 | 11/2009 |
| WO | WO 2010/105130 A2 | 9/2010 |
| WO | WO 2011/050287 A1 | 4/2011 |
| WO | WO 2012/058382 A2 | 5/2012 |

OTHER PUBLICATIONS

STIC Search.*
PCT International Search Report for International Application No. PCT/US2014/063696, dated Feb. 12, 2015.
Written Opinion for International Application No. PCT/US2014/063696, dated Feb. 12, 2015.
Ciolino et al., "In vivo performance of a drug-eluting contact lens to treat glaucoma for a month", Biomaterials, 35 (2014), 432-439.
Severinsky et al., "Curent applications and efficacy of sclera contact lenses—a retrospective study", 2010, 5 pages.
"Innovative drug-dispensing contact lens delivers glaucoma mediation continuously for a month", Ophthalmology, Dec. 9, 2013, 2 pages.
"Piggyback Lens" for Advanced Keratoconus, prior to Dec. 6, 2013, pp. 18-19.
PCT International Search Report for International Application No. PCT/US2016/017792 dated May 11, 2016.
International Preliminary Report on Patentability for International Application No. PCT/US2016/017792, dated Sep. 12, 2017, 8 pages.

* cited by examiner

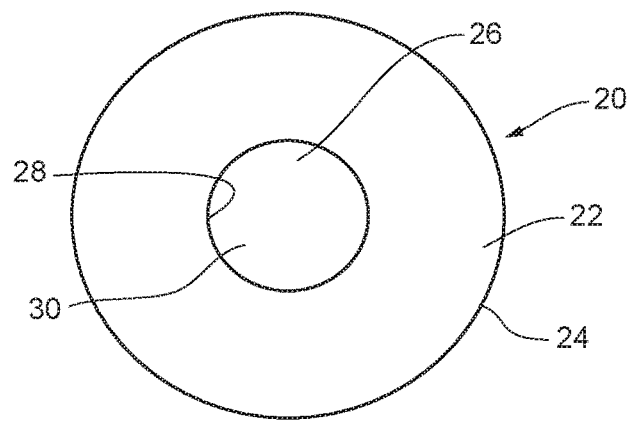
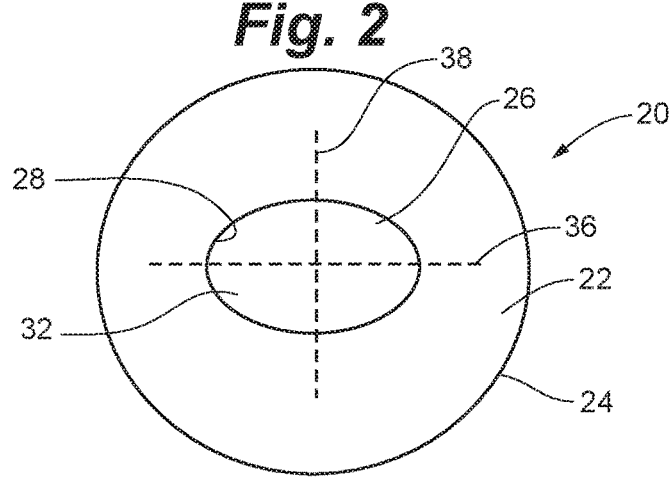
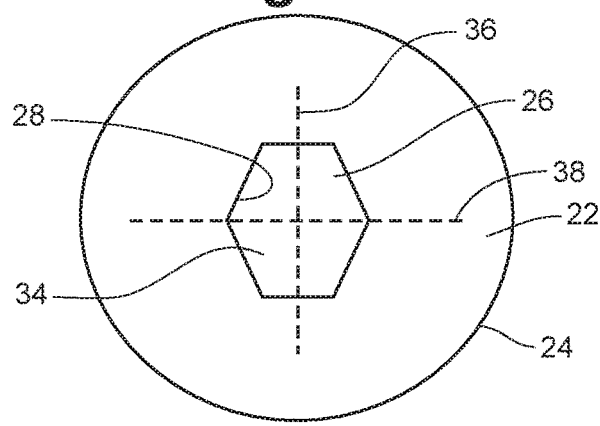

TEAR SHAPING FOR REFRACTIVE CORRECTION

FIELD OF THE INVENTION

The invention generally relates to contact lenses and refractive correction by applications of contact lenses or other structures to the eye.

BACKGROUND OF THE INVENTION

Known contact lenses generally cover virtually all of the cornea or cover the cornea centrally while leaving a portion of the peripheral cornea uncovered. Contact lenses known to the Applicant achieve refractive correction because of the optical nature of an optically transparent, rigid, semi-rigid or flexible material that refracts light and thus alters the refraction of light striking the cornea and passing through the other optical parts of the eye to an image formed on the retina.

The concept of a tear lens is known to exist in the context of conventional contact lenses. The tear lens is formed by a layer of tears bounded on an anterior surface by the back of a contact lens optical zone and at a posterior surface of the tear lens by the surface of the corneal epithelium. A tear lens, as understood in this conventional sense, contributes to refractive correction primarily in the context of rigid contact lenses. This is because the posterior surface of the rigid contact lens maintains its shape and curvature independent of the shape of the cornea and affects the focusing of light in addition to the refractive power of the contact lens. While a tear lens technically exists in the context of flexible or soft contact lenses, the effect of the tear lens on refraction is negligible because of the general conformity of the soft contact lens shape to the shape of the cornea.

Numerous possible complications are known to exist with use of contact lenses on the cornea even though modern contact lenses cause fewer complications than contact lenses of decades ago. The presence of contact lenses can lead to stasis and entrapment of the tear film which can lead to an accumulation of corneal epithelial waste products in the entrapped tear film. Corneal epithelial waste products in high enough concentrations can be toxic to the cells of the corneal epithelium. Mechanical interaction between the posterior surface of the contact lens and the corneal epithelium can lead to abrasion or distortion. Entrapment of solid objects, however tiny between the posterior surface of the contact lens and the anterior corneal epithelium can also lead to corneal epithelial abrasion. Under some circumstances, the reduction of oxygen available to the corneal epithelium by having the barrier of the contact lens between the corneal epithelium and the atmosphere can lead to health complications for the corneal epithelium as well.

There is still room for improvement in the arts of refractive correction by application of lenses to the eye.

SUMMARY OF THE INVENTION

The invention solves many of the above stated problems by providing a lens having a central opening which centers on the optical axis of the eye. The central opening is structured such that capillary action forms a meniscus of tears in the opening. According to an example embodiment of the invention, the inventive lens is structured so that a concave meniscus is formed. The concave meniscus is provided for correction of myopia. It is expected that a concave meniscus will form in a relatively larger diameter opening according to embodiments of the invention.

According to another example embodiment of the application, a convex meniscus is formed. A convex meniscus is expected to form in a case of a smaller diameter opening in the lens which generally overlies the optical axis of the eye.

According to another example embodiment of the invention, the opening is non-circular in structure. For example, an oval opening is expected to create a meniscus having a first curvature in a first axis and a second curvature in a second axis and thereby permitting correction of astigmatism by the tear meniscus formed. According to example embodiments of the invention, the central opening may be oval in shape or polygonal having a first axis longer than a second axis to achieve the astigmatic correction.

According to example embodiments of the invention, the cross-sectional shape of the edge or periphery of the opening may vary when viewed in cross-section.

According to an example embodiment, the cross-sectional shape of the periphery of the opening may demonstrate a thick rim. According to another example embodiment, the cross-sectional shape of the periphery of the opening may demonstrate the thin rim.

According to another embodiment, the cross-sectional shape of the periphery of the opening may demonstrate a straight rim. The straight rim may be substantially radial in orientation as compared to the curvature of the lens and opening or may be tilted to create an acute or obtuse angle relative to a tangent to the corneal surface.

According to another example embodiment of the invention, the periphery of the opening may demonstrate a concave shape when viewed in cross section.

According to another example embodiment of the invention, the periphery of the opening may demonstrate a convex shape when viewed in cross section.

According to another example embodiment of the invention, the cross-sectional shape of the periphery of the opening may demonstrate a polygonal cross-section which may be either concave or convex.

According to other example embodiments of the invention, the cross-sectional shape of the rim may vary around the circumference of the periphery of the opening. For example, a portion or portions of the periphery of the opening when viewed in cross-section may be concave while other portions may be convex.

According to another example embodiment of the invention, the perimeter of the rim may vary in shape when viewed in an anterior-posterior direction.

According to another example embodiment of the invention, the perimeter of the rim viewed anterior to posterior may have a smooth continuous curved shape.

According to another example embodiment of the invention, the perimeter of the rim when viewed anterior to posterior may include indentations in the rim perimeter.

According to another example embodiment of the invention, the rim perimeter may include appendages extending inwardly from the rim.

According to another example embodiment of the invention, the periphery of the opening when viewed in an anterior to posterior direction may have a circular shape. According to another example embodiment of the invention, the periphery of the opening when viewed in an anterior to posterior direction may have an oval shape and according to another example embodiment of the invention, the periphery of the opening in viewed in an anterior to posterior direction may have a polygonal shape. The polygonal shape may include a regular polygon or an irregular polygon shape. The polygon may be generally radially symmetrical or may be other than radially symmetrical.

BRIEF DESCRIPTION OF THE DRAWINGS

FIG. 1 is an anterior to posterior view of a lens for refractive tear shaping having a circular central opening therein;

FIG. 2 is an anterior to posterior view of a lens for refractive tear shaping having an oval central opening therein;

FIG. 3 is a lens for refractive tear shaping having a polygonal opening therein;

DETAILED DESCRIPTION

Figure 4:
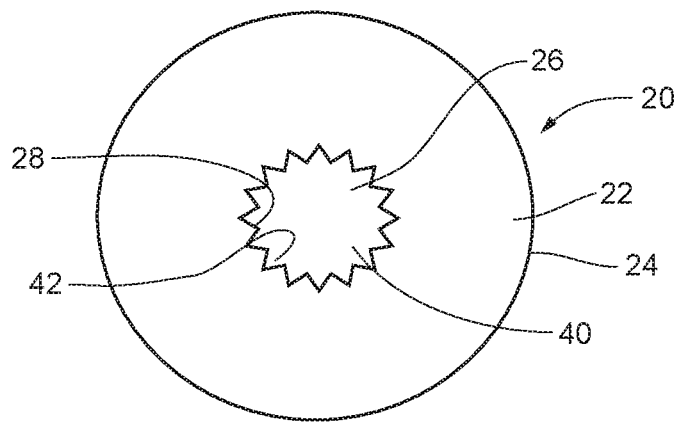
FIG. 4 is an anterior to posterior view of a lens for refractive tear shaping having a stellate opening with indentations according to an example embodiment of the invention.

Referring to FIGS. 1-13, the invention is directed to lens for refractive tear shaping 20 wherein refractive correction is achieved or enhanced by the shaping of the tear film.

Referring particularly to FIGS. 1-6, lens for refractive tear shaping 20 according to an example embodiment of the invention generally includes lens body 22 having peripheral edge 24 and defining central opening 26. Central opening 26 is surrounded by a tear shaping edge 28. According to the depicted embodiment, tear shaping edge 28 defines circular central opening 30. Tear shaping edge 28 can have a number of cross sectional structures and shapes as described below.

Referring now to FIG. 2, another embodiment of lens for refractive tear shaping 20 is depicted. The depicted embodiment includes lens body 22 having peripheral edge 24 and elliptical or oval central opening 32. Elliptical or oval central opening 32 is bounded by tear shaping edge 28.

Referring to FIG. 3, another embodiment of lens for refractive tear shaping 20 is depicted having polygonal central opening 34. Polygonal central opening 34 is depicted as an irregular hexagon, however polygonal central opening 34 may have more or less than six sides and six vertices.

Referring particularly to FIGS. 2 and 3, elliptical or oval central opening 32 and polygonal central opening 34 may have long axis 36 and short axis 38.

Referring now to FIG. 4, according to another embodiment, lens for refractive tear shaping 20 defines stellate opening 40 having indentations into the material of the lens surrounding stellate opening 40. While stellate opening 40 is depicted as circularly symmetrical, stellate opening 40 may also have long axis 36 and short axis 38.

Figure 5:
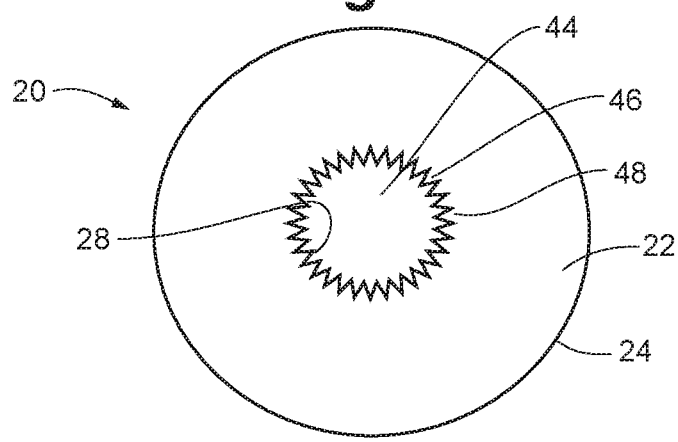
FIG. 5 is an anterior to posterior view of a lens for refractive tear shaping having a stellate opening with appendages according to an example embodiment of the invention.

Referring now to FIG. 5, another embodiment of lens for refractive tear shaping 20 is depicted. According to the depicted embodiment, stellate opening with appendages 44 is depicted. Appendages 46 extend inwardly from outer edge 48. While depicted as circularly symmetrical, stellate opening with appendages 44 may also have long axis 36 and short axis 38.

Figure 6:
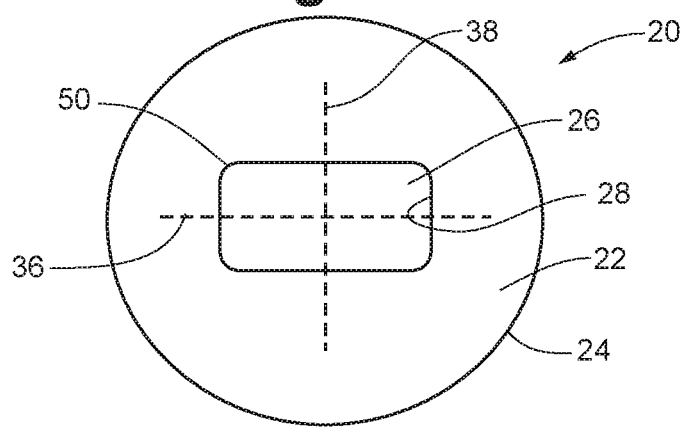
FIG. 6 is an anterior to posterior view of a lens for refractive tear shaping having a generally rectangular polygonal opening therein according to an example embodiment of the invention.

Referring now to FIG. 6, lens for refractive tear shaping 20 with rectangular opening 50 is depicted. Rectangular opening 50 is depicted having a particular proportional aspect ratio, however this should not be considered limiting as the aspect ratio of rectangular opening 50 may be altered by altering the length of long axis 36 as compared to short axis 38.

Referring now to FIGS. 7-13, cross-sectional views of example embodiments of lens for refractive tear shaping 20 are depicted.

Figure 7:
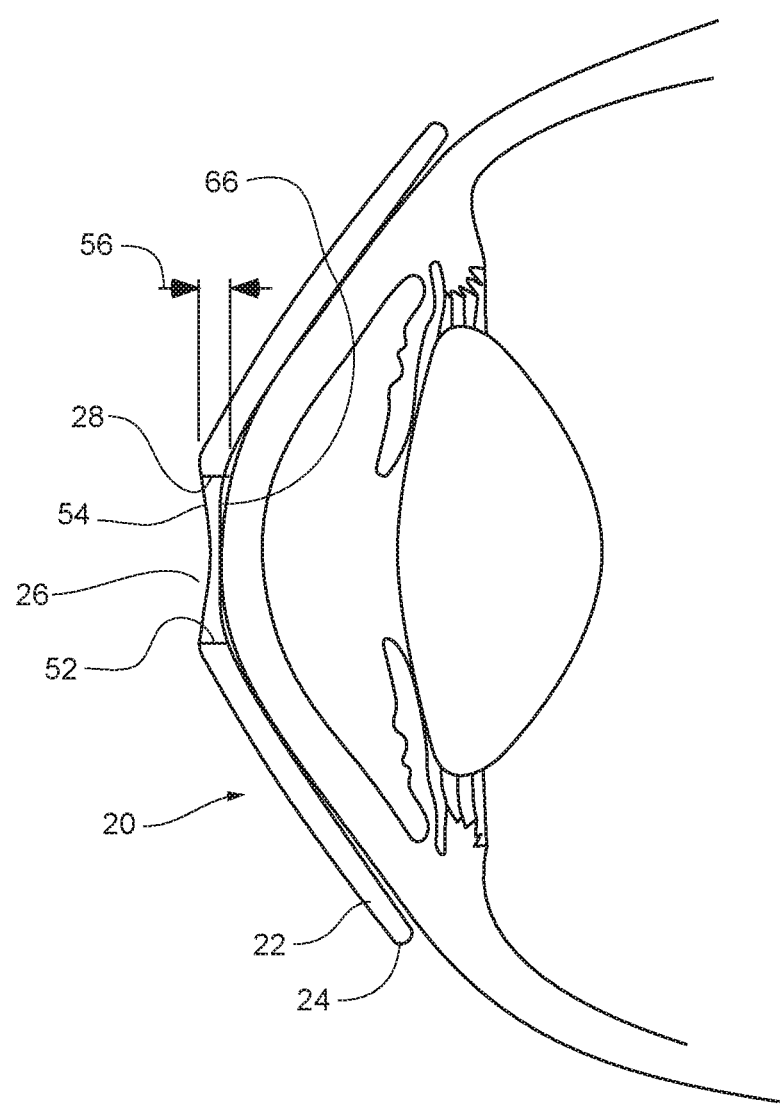
FIG. 7 is a cross-sectional view of a lens for refractive tear shaping in situ on a cornea and with a concave tear meniscus according to any example embodiment of the invention.

Referring particularly to FIG. 7, an embodiment of the invention including parallel tear shaping edge 52 is depicted. It is noted that lens body 22 in the embodiment depicted in FIG. 7 that parallel tear shaping edge 52 is generally parallel on opposing sides of central opening 26. Also depicted in FIG. 7 is concave tear meniscus 54. Concave tear meniscus 54 affects a negative refractive power due to its concave shape and is expected to contribute focusing power for correction of myopia. It is expected that the concavity of concave tear meniscus 54 will vary with the size of central opening 26 and with the depth 56 of tear shaping edge 28.

It is expected that to a certain point smaller diameter of central opening 26 will create a more steeply curved concave tear meniscus imparting greater negative refractive power and stronger correction for myopia. It is also expected that increasing depth 56 of tear shaping edge 28 will increase negative refractive power to a certain degree. As discussed above, central opening 26 may have various shapes, some of which include a long axis 36 and short axis 38.

It is expected that by judicious selection of the size of long axis 36 and short axis 38 that astigmatism may be corrected by creating a concave tear meniscus 54 having different shape and therefore differing power on various meridians.

Figure 8:
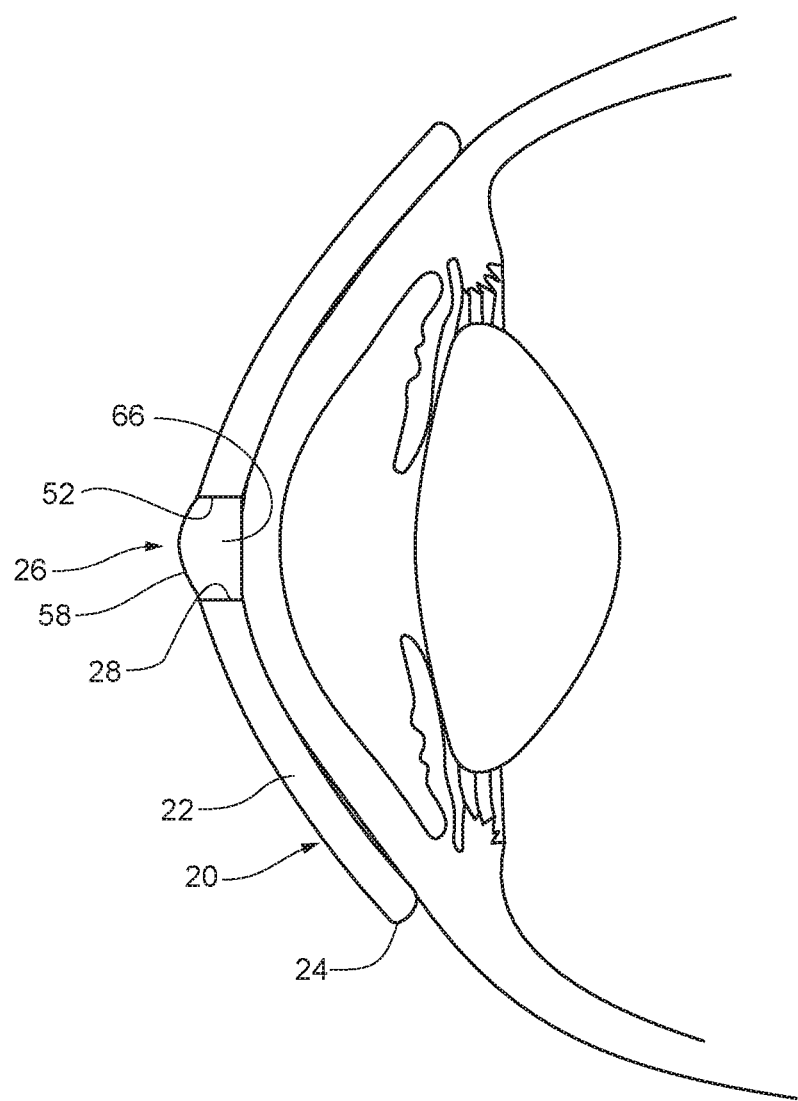
FIG. 8 is a cross-sectional view of a lens for refractive tear shaping in situ on a cornea with a convex tear meniscus according to an example embodiment of the invention.

Referring now to FIG. 8, lens for refractive tear shaping 20 having parallel tear shaping edge 52 is sized and configured to create convex tear meniscus 58. It is expected that when the size of central opening 26 is reduced to a sufficient degree, convex tear meniscus 58 will be formed in central opening 26. FIG. 8 depicts parallel tear shaping edge 52 along with a smaller diameter central opening 26 than does FIG. 7. It is expected that when the size of central opening 26 and depth 56 of tear shaping edge are appropriate convex tear meniscus 58 will be formed.

Figure 9:
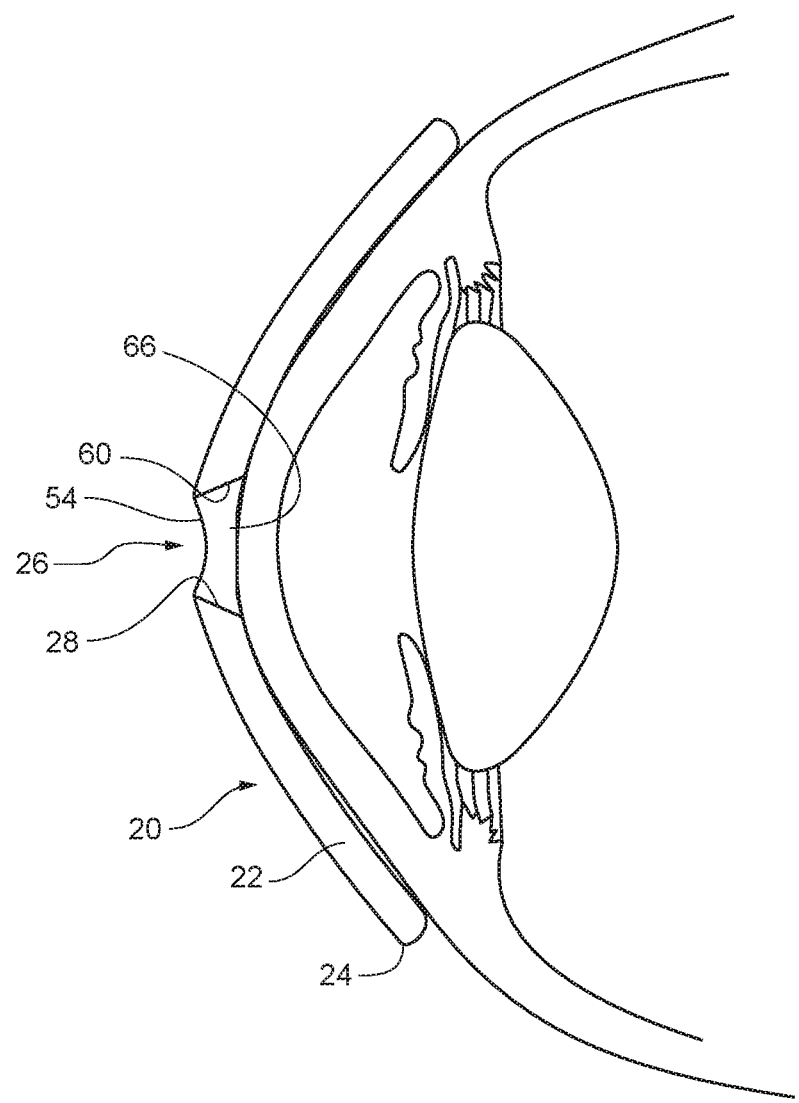
FIG. 9 is a cross-sectional view of a lens for refractive tear shaping in situ on a cornea with a central opening having inward angled edges and a concave tear meniscus according to an example embodiment of the invention.

Referring now to FIG. 9, lens for refractive tear shaping 20 with anterior acute tear shaping edge 60 is depicted. It is noted that anterior acute tear shaping edge 60 is arranged so that tear shaping edge 28 narrows from posteriorly-to-anteriorly. Concave tear meniscus 54 is also depicted. It is expected that anterior acute tear shaping edge 60 will create a more concave tear meniscus 54 thus, creating greater negative refractive power to concave tear meniscus 54.

Figure 10:
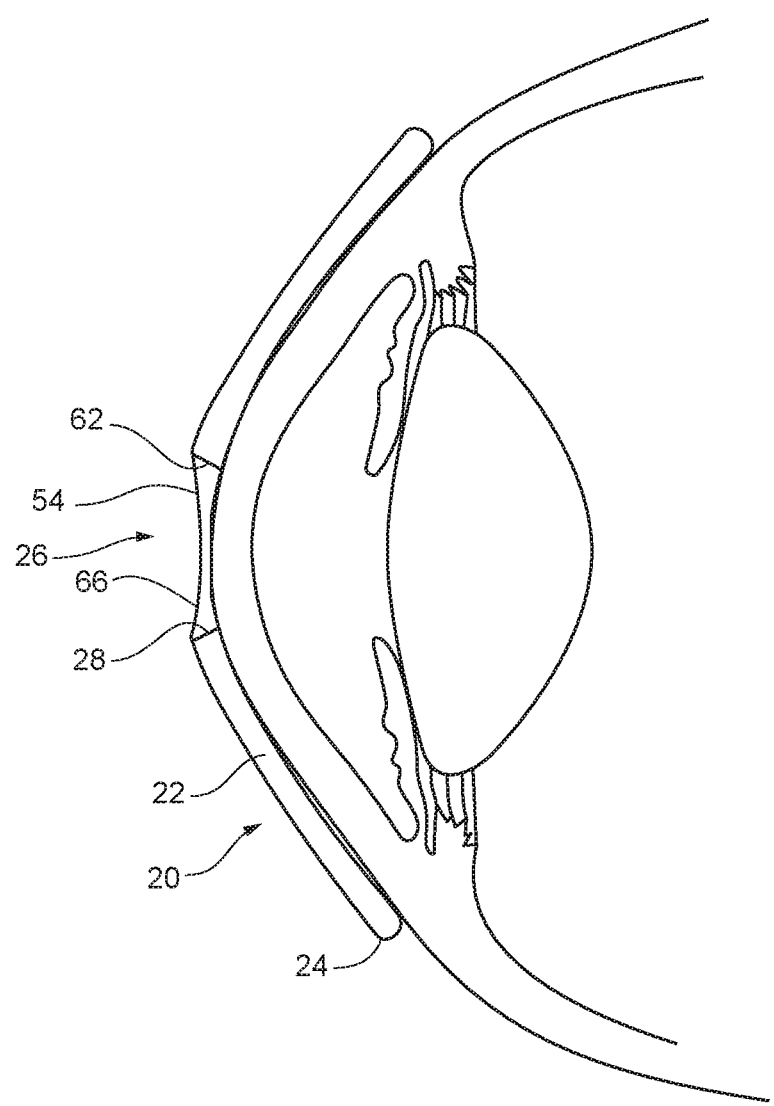
FIG. 10 is a cross-sectional view of a lens for refractive tear shaping in situ on a cornea with a concave tear meniscus and outwardly angled edges according to an example embodiment of the invention.

Referring now to FIG. 10, lens for refractive tear shaping 20 having anterior obtuse tear shaping edge 62 is depicted. Anterior obtuse tear shaping edge 62 is structured so that central opening 26 is wider anteriorly and narrower posteriorly. It is expected that anterior obtuse tear shaping edge 62 will create a flatter concave tear meniscus 54 as depicted in FIG. 10 thus, creating a concave tear meniscus having less negative refractive power than parallel tear shaping edge 52 having a similar posterior diameter.

Figure 11:
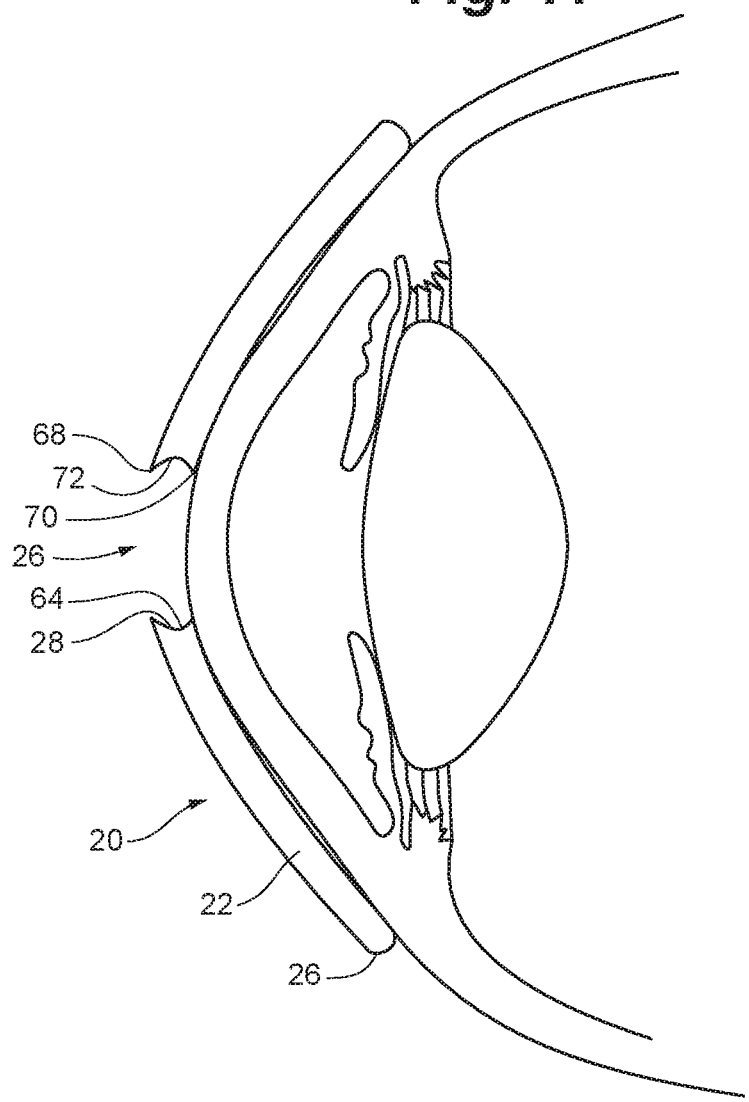
FIG. 11 is a cross-sectional view of a lens for refractive tear shaping having an opening with concave peripheral edges according to an example embodiment of the invention with the tear meniscus not depicted.

Referring now to FIG. 11, lens for refractive tear shaping 20 having concave tear shaping edge 64 is depicted. In FIG. 11, no tear meniscus 66 is depicted for clarity. Concave tear shaping edge 64 includes anterior edge 68, posterior edge 70 and concave portion 72.

Figure 12:
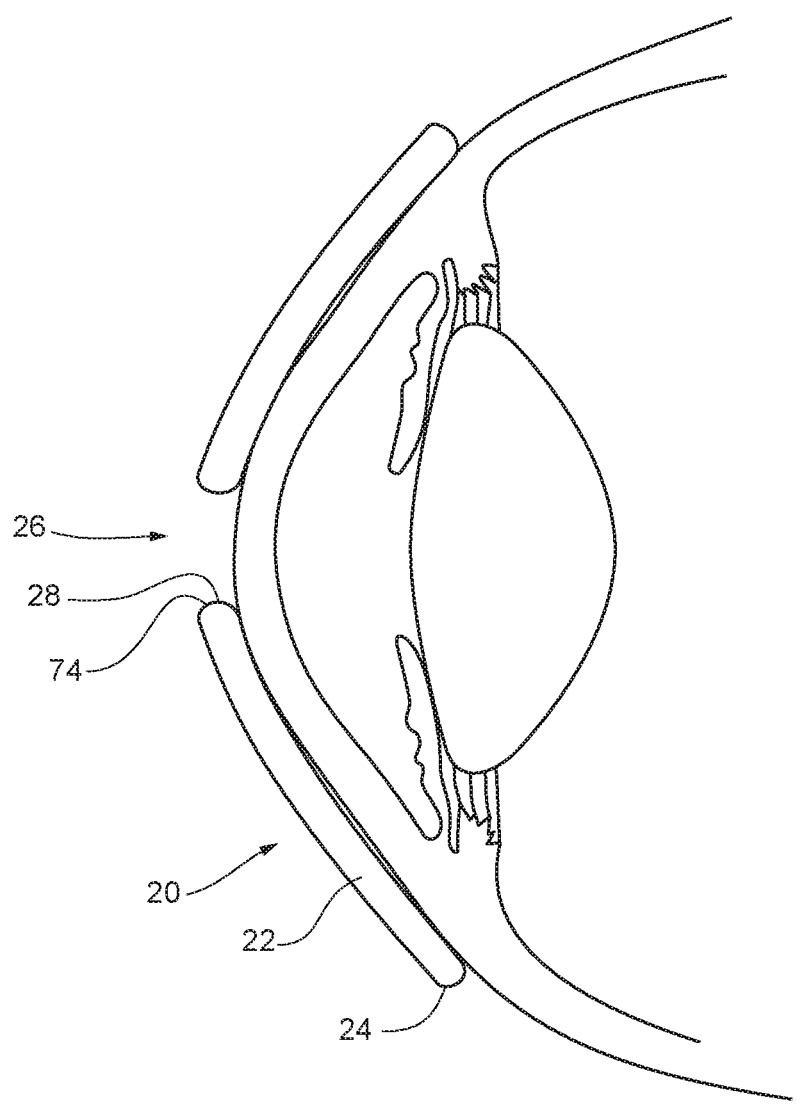
FIG. 12 is a cross-sectional view of a lens for refractive tear shaping having an opening with convex peripheral edges in situ on a cornea according to an example embodiment of the invention with the tear meniscus not depicted.

Referring now to FIG. 12, lens for refractive tear shaping 20 with convex tear shaping edge 74 is depicted. No tear meniscus 66 is depicted for clarity. In the depicted embodiment, convex tear shaping edge 74 has a radius of curvature approximately equal to half of depth 56 of tear shaping edge 20. This should not be considered limiting however as the radius of curvature of convex tear shaping edge 74 may vary.

Figure 13:
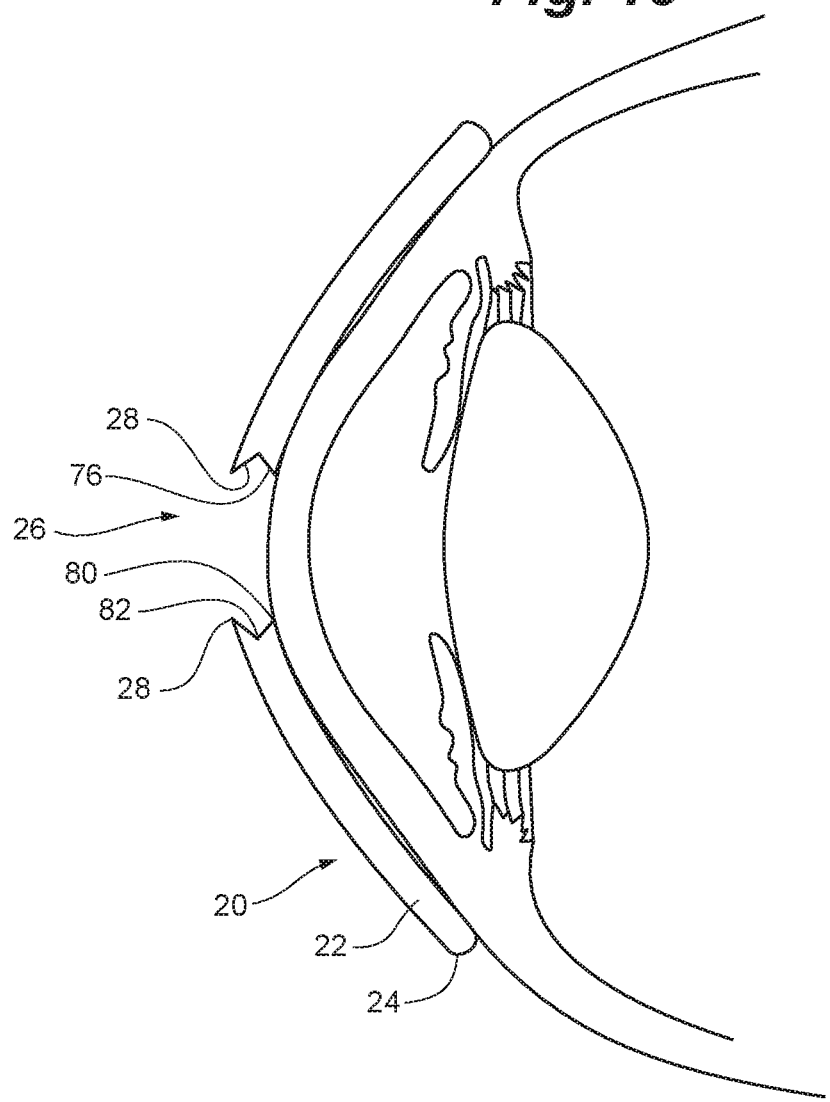
FIG. 13 is a lens for refractive tear shaping in situ on a cornea with an opening having polygonal peripheral edges with the tear meniscus not depicted.

Referring now to FIG. 13, lens for refractive tear shaping 20 with faceted tear shaping edge 76 is depicted. Faceted tear shaping edge 76 presents anterior edge 78, posterior edge 80 and internal angle portion 82.

Lens for refractive tear shaping 20 according to the various embodiments described herein may be formed from hydrogel polymers of the types used in soft contact lens that are now available or any hydrogel polymer materials to be developed in the future. Hydrogel polymers are generally water absorbent and hydrogel polymers may be used to manufacture lenses for refractive tear shaping 20 according to the invention by methods including but not limited to lathe cutting, cast molding, spin casting and injection molding. Lenses for refractive tear shaping 20 may also be manufactured from rigid oxygen permeable materials by known manufacturing processes including lathe cutting. It is to be understood that lens for refractive tear shaping 20 may be manufactured by any known contact lens manufacturing process or contact lens manufacturing processes to be developed in the future.

Lenses for refractive tear shaping 20 are expected to be made in diameters ranging from approximately 5 mm to 16 mm. Certain features of lens for refractive tear shaping 20 such as central opening 26 diameter, the structure of tear shaping edge 28, the appropriate length of long axis 36 and short axis 38 to achieve desired refractive correction are expected to be developed with a certain degree of experimentation. It is expected that this degree of experimentation will not be undue and that those of ordinary skill in the art based on the present application disclosure will be able to engage in such experimentation without significant difficulty.

It is expected that for formation of concave tear meniscus 54, that smaller diameter central openings 26 will result in higher refractive power of concave tear meniscus 54, thus permitting higher degrees of refractive correction for myopia. It is also expected that when the diameter of central opening 26 becomes sufficiently small, tear meniscus 66 will transition from concave tear meniscus 54 to convex tear meniscus 58. Determination of this transition diameter for transition is expected to be achievable by reasonable levels of experimentation.

The effect of depth 56 of tear shaping edge 28 on refractive power of tear meniscus 66 also should be determinable by reasonable experimentation. It is expected that greater depth 56 will generally create a thicker periphery of tear meniscus 66 resulting in higher degrees to concavity of concave tear meniscus 54 and greater myopic correction.

Further, understanding of the effect of other features of the disclosed lenses including anterior acute tear shaping edge 60, anterior obtuse tear shaping edge 62, concave tear shaping edge 64, convex tear shaping edge 74 and faceted tear shaping edge 76 are expected to be achieved by reasonable experimentation well within the ability of one of ordinary skill in the art. It is expected that such experimentation will not be undue. It is also expected that the effect of stellate opening 40 with indentations 42 as well as stellate opening with appendages 44 and appendages 46 can also be determined experimentally.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

The invention claimed is:

1. A corneal contact lens for refractive tear shaping, comprising:
   a curved lens body having a peripheral edge and defining a central opening therein, the central opening being a full thickness opening extending from an anterior surface to a posterior surface of the curved lens body;
   the central opening being shaped and sized and having a tear shaping edge structured to form a tear meniscus within the central opening the tear meniscus being formed at a refractive interface between tear film within the central opening and ambient atmosphere, wherein size, shape and tear shaping edge structure are selectable to make the tear meniscus anteriorly convex, anteriorly plano or anteriorly concave, whereby the tear meniscus provides refractive correction; and
   the tear meniscus being formed by interaction of a tear film of the eye and the tear shaping edge and having a posterior curvature conforming to an anterior corneal curvature and an anterior curvature, the anterior curvature being dependent on the size and shape of the central opening and structure of the tear shaping edge and the anterior curvature forming the refractive interface between the tear meniscus of the tear film and the ambient atmosphere whereby refractive correction of refractive error is achieved.

2. The lens for refractive tear shaping as claimed in claim 1, wherein the central opening is circular in shape.

3. The lens for refractive tear shaping as claimed in claim 1, wherein the central opening is oval or elliptical in shape.

4. The lens for refractive tear shaping as claimed in claim 1, wherein the central opening is polygonal in shape.

5. The lens for refractive tear shaping as claimed in claim 1, wherein the central opening is stellate in shape and comprises indentations extending outwardly into an edge of the central opening.

6. The lens for refractive tear shaping as claimed in claim 1, wherein the central opening is stellate in shape and comprises appendages extending inwardly from an edge of the central opening.

7. The lens for refractive tear shaping as claimed in claim 1, wherein the central opening presents a long axis and a short axis.

8. The lens for refractive tear shaping as claimed in claim 1, wherein the tear shaping edge is substantially parallel around a perimeter of the central opening.

9. The lens for refractive tear shaping as claimed in claim 1, wherein the tear shaping edge is anteriorly acute when viewed in cross section such that the diameter of the central opening is greater posteriorly than anteriorly.

10. The lens for refractive tear shaping as claimed in claim 1, wherein the tear shaping edge is anteriorly obtuse when viewed in cross section such that the diameter of the central opening is less posteriorly than anteriorly.

11. The lens for refractive tear shaping as claimed in claim 1, wherein the tear shaping edge is concave when viewed in cross section.

12. The lens for refractive tear shaping as claimed in claim 11, wherein the tear shaping edge further comprises an anterior edge, a posterior edge and a concave portion when viewed in cross section.

13. The lens for refractive tear shaping as claimed in claim 1, wherein the tear shaping edge is convex when viewed in cross section.

14. The lens for refractive tear shaping as claimed in claim 1, wherein the tear shaping edge presents at least one angular indentation when viewed in cross section.

15. The lens for refractive tear shaping as claimed in claim 1, wherein the tear shaping edge when viewed in cross section is consistent in structure about a circumference of the central opening.

16. The lens for refractive tear shaping as claimed in claim 1, wherein the tear shaping edge when viewed in cross section is variable in structure about a circumference of the central opening.

17. The lens for refractive tear shaping as claimed in claim 1, wherein the tear shaping edge has no sharp edges or corners.

18. A method of correcting refractive error of an eye; comprising:

applying a corneal contact lens to the eye having a central opening therein, the corneal contact lens comprising a curved lens body having a peripheral edge and defining the central opening therein, the central opening being a full thickness opening extending from an anterior surface to a posterior surface of the curved lens body, wherein size, shape and tear shaping edge structure are selectable; and shaping the tear film within the central opening to form a tear meniscus by capillary action between the tear meniscus and a tear shaping edge of the central opening; and manipulating the tear meniscus formed to make the tear meniscus anteriorly convex, anteriorly plano or anteriorly concave and to alter an amount of convexity or concavity of the tear film by varying the size of the central opening, by varying the shape of the central opening, by varying the structure of the tear shaping edge or by a combination of varying the size, varying the shape of the central opening and by varying the structure of the tear shaping edge, wherein the tear meniscus forms a refractive interface between the tear meniscus of the tear film in the ambient atmosphere and provides refractive correction to the eye.

19. The method as claimed in claim 18, further comprising manipulating the tear meniscus by selecting the corneal contact lens such that the central opening has long axis and a short axis.

20. The method as claimed in claim 18, further comprising manipulating the tear meniscus by selecting the corneal contact lens such that the central opening has a polygonal shape.

* * * * *